United States Patent
Okuda et al.

(10) Patent No.: US 8,617,302 B2
(45) Date of Patent: *Dec. 31, 2013

(54) WHITE INK COMPOSITION

(75) Inventors: Ippei Okuda, Shiojiri (JP); Tsuyoshi Sano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/253,106

(22) Filed: Oct. 5, 2011

(65) Prior Publication Data

US 2012/0079960 A1 Apr. 5, 2012

(30) Foreign Application Priority Data

Oct. 5, 2010 (JP) .................. 2010-225428
Oct. 22, 2010 (JP) .................. 2010-237163

(51) Int. Cl.
*C09D 11/00* (2006.01)
(52) U.S. Cl.
USPC .............. 106/31.86; 106/31.65; 106/31.61
(58) Field of Classification Search
USPC .............. 106/31.86, 31.65, 31.61
See application file for complete search history.

(56) References Cited

U.S. PATENT DOCUMENTS

| | | | |
|---|---|---|---|
| 3,562,754 A | 2/1971 | Placido | |
| 4,880,465 A | 11/1989 | Loria et al. | |
| 5,403,872 A * | 4/1995 | Koreska | 523/161 |
| 6,025,413 A * | 2/2000 | Xu et al. | 523/161 |
| 7,513,945 B2 | 4/2009 | Nakano et al. | |
| 2007/0060734 A1 | 3/2007 | Bruchmann et al. | |
| 2008/0070015 A1 | 3/2008 | Fischer | |
| 2009/0176071 A1 | 7/2009 | Koganehira et al. | |
| 2009/0182098 A1 | 7/2009 | Sano et al. | |
| 2009/0220695 A1 | 9/2009 | Oyanagi et al. | |
| 2009/0246479 A1 | 10/2009 | Mukai et al. | |
| 2010/0010121 A1 | 1/2010 | Koganehira et al. | |
| 2010/0039463 A1 | 2/2010 | Van Thillo et al. | |
| 2011/0184108 A1 | 7/2011 | Okuda et al. | |
| 2011/0262724 A1 * | 10/2011 | Okuda et al. | 428/207 |
| 2011/0300298 A1 * | 12/2011 | Kamibayashi et al. | 427/256 |
| 2012/0040155 A1 * | 2/2012 | Komatsu et al. | 428/204 |
| 2012/0176441 A1 | 7/2012 | Kagata et al. | |

FOREIGN PATENT DOCUMENTS

| | | |
|---|---|---|
| EP | 2 154 210 A2 | 2/2010 |
| JP | 60-008376 A | 1/1985 |
| JP | 2006-096933 A | 4/2006 |
| JP | 2007-16103 A | 1/2007 |
| JP | 2007-194175 A | 8/2007 |
| JP | 2008-013714 A | 1/2008 |
| JP | 2008-120846 A | 5/2008 |
| JP | 2009-096914 A | 5/2009 |
| JP | 2009-138077 A | 6/2009 |
| JP | 2009-138078 A | 6/2009 |
| JP | 2009-242441 A | 10/2009 |
| JP | 2009-242482 A | 10/2009 |

OTHER PUBLICATIONS

European Search Report, Application No. 11163647.8, dated Jul. 1, 2011.

* cited by examiner

*Primary Examiner* — Kaj K Olsen
*Assistant Examiner* — Veronica F Faison
(74) *Attorney, Agent, or Firm* — Nutter McClennen & Fish LLP; John J. Penny, V.; Christopher A. Potts

(57) ABSTRACT

A white ink composition contains a white or whitish pigment, an ethylene-vinyl acetate (EVA) resin or a polyolefin wax, and a fluorene resin or a styrene acrylic resin.

15 Claims, No Drawings

WHITE INK COMPOSITION

Priority is claimed under 35 U.S.C. §119 to Japanese Application No. 2010-225428 filed on Oct. 5, 2010 and Application No. 2010-237163 filed on Oct. 22, 2010 are hereby incorporated by reference in its entirety.

BACKGROUND

1. Technical Field

The present invention relates to a white ink composition.

2. Related Art

Ink has been used in combination with various recording methods to form images on recording media. Inks for this purpose, or image-forming inks, may have different formulae to fulfill their intended use.

For example, JP-A-2008-120846 describes an ultraviolet-curable overprint ink composition for protecting printed layers, and JP-A-2007-194175 a conductor-patterning ink for ink jet circuit pattern formation.

Depending on the formula of the ink, the recording method, and other conditions, images fixed on a recording medium may crack. As a preventive measure against this defect, the former of the patent publications mentioned above, JP-A-2008-120846, proposes adding ethylene-vinyl acetate (EVA) to a correction-fluid composition so that the dried correction fluid can be free from cracks even when deformed by bending the printed matter.

However, adding extra substances to an ink composition to prevent cracking on images may lead to a decreased rubfastness of the images, according to the first of the patent publications, JP-A-2008-120846.

SUMMARY

An advantage of some aspects of the invention is to provide a white ink composition that reduces the occurrence of cracks and also allows for recording images highly resistant to frictions.

The invention can be implemented as the following aspects or applications.

Application 1

The white ink composition according to this application is a white ink composition containing a white or whitish pigment, an ethylene-vinyl acetate (EVA) resin or a polyolefin wax, and a resin component that cracks when dropped in an amount of 0.5 g onto a glass slide and dried for 10 minutes under a temperature of 50° C. and a relative humidity of 0% RH.

Application 2

The white ink composition according to this application is a white ink composition containing a white or whitish pigment, an EVA resin or a polyolefin wax, and a fluorene resin or a styrene acrylic resin.

Application 3

In the white ink composition according to this application, the resin component is a fluorene resin or a styrene acrylic resin.

Application 4

In the white ink composition according to this application, the ratio (W1/W2) of the EVA resin content (W1) to the resin component content (W2) is in a range of 1/6 to 60/13, inclusive.

Application 5

In the white ink composition according to this application, the ratio (W1/W2) of the polyolefin wax content (W1) to the resin component content (W2) is in a range of 1/10 to 6, inclusive.

Application 6

In the white ink composition according to this application, the white or whitish pigment is titanium dioxide.

Application 7

In the white ink composition according to this application, the average particle size of the polyolefin wax is in a range of 10 to 800 nm, inclusive.

Application 8

In the white ink composition according to this application, the average particle size of the EVA resin is in a range of 10 to 800 nm, inclusive.

Application 9

In the white ink composition according to this application, the average particle size of the white or whitish pigment is in a range of 200 to 400 nm, inclusive.

Application 10

In the white ink composition according to this application, the average particle size R1 of the EVA resin and the average particle size R2 of the white or whitish pigment satisfy a relation R1≥R2.

Application 11

In the white ink composition according to this application, the resin component content is in a range of 0.4 to 5 percent by mass, inclusive.

Application 12

This application is a recording apparatus making a record using the white ink composition.

Application 13

This application is a record made using the white ink composition.

DESCRIPTION OF EXEMPLARY EMBODIMENTS

The following describes some preferred embodiments of the invention. The embodiments described below explain an example of the invention. The invention is never limited to these embodiments and includes various modifications that can be implemented without departing from the gist of the invention.

1. White Ink Composition

The white ink composition according to an embodiment of the invention contains a white or whitish pigment, an ethylene-vinyl acetate (EVA) resin or a polyolefin wax, and a resin component. The following details the individual ingredients of the white ink composition according to this embodiment.

1.1. White or Whitish Pigment

The white ink composition according to this embodiment contains a white or whitish pigment. Examples of appropriate white or whitish pigments include metal oxides, barium sulfate, and calcium carbonate. Examples of appropriate metal oxides include titanium dioxide, zinc oxide, silica, alumina, and magnesium oxide. This white or whitish pigment includes all kinds of hollow particles, including known ones. For example, the kinds of particles described in U.S. Pat. Nos. 4,880,465 and 3,562,754 can be suitably used. Titanium dioxide is particularly suitable for use as the white or whitish pigment in the white ink composition according to this embodiment because of its whiteness and rubfastness.

The white or whitish pigment content (on a solid basis) is preferably in a range of 1 to 20 percent by mass (mass %), inclusive, and more preferably 5 to 15 mass %, inclusive, relative to the total mass of the white ink composition. In any content exceeding this range, the white or whitish pigment may clog the ink jet recording head used with the white ink composition and lead to a reduced reliability. When the white or whitish pigment is contained in any content falling short of this range, however, the white ink composition often lacks whiteness and other color consistency attributes.

The average particle size on a volume basis (hereinafter, simply referred to as the average particle size) of the white or whitish pigment is preferably in a range of 30 to 600 nm, inclusive, and more preferably 200 to 400 nm, inclusive. With any average particle size exceeding this range, the white or whitish pigment may be lacking in dispersion stability because of the precipitation of its particles and other causes and/or give rise to reliability issues by, for example, clogging the ink jet recording head used with the white ink composition. When the white or whitish pigment has any average particle size falling short of this range, however, the white ink composition often lacks whiteness.

The average particle size of the white or whitish pigment can be determined using a laser diffraction/scattering particle size distribution analyzer, such as those using dynamic light scattering as the measurement principle (e.g., Microtrac UPA available from Nikkiso Co., Ltd.).

In the invention, the white ink composition is defined as those with which the brightness (L*) and chromaticity parameters (a* and b*) fall within the ranges $70 \leq L^* \leq 100$, $-4.5 \leq a^* \leq 2$, and $-6 \leq b^* \leq 2.5$ when the ink is ejected onto Epson's genuine Photo Paper Glossy (Seiko Epson Corp.) at a duty of at least 100% and analyzed using Spectrolino spectrophotometer (a trade name; available from GratagMacbeth) under the following conditions: light source: D50; field of view: 2°; density: DIN NB; white balance: Abs; filter: No; mode of measurement: Reflectance.

And, in this specification, the duty is the value calculated by the following equation.

Duty (%)=Actual number of dots ejected/(Vertical resolution×Horizontal resolution)×100

(where the actual number of dots ejected, the vertical resolution, and the horizontal resolution are values per unit area.)

1.2. Ethylene-Vinyl Acetate (EVA) Resin

The white ink composition according to this embodiment contains an ethylene-vinyl acetate (EVA) resin. One of the functions of this EVA resin is to reduce cracking on images. The white ink composition according to this embodiment contains a fluorene resin or a styrene acrylic resin as described later, and the images recorded therewith may crack. In such cases, cracking on the images can be effectively reduced by adding an EVA resin.

The EVA resin may be in emulsion form, where particles of the resin are dispersed in solvent, or solution form, where the resin is dissolved in solvent; however, the former is preferred. EVA resins can effectively reduce cracking on images and thus are particularly preferred, and they may be used singly or in combination of two or more.

Examples of commercially available EVA resins suitable for use in the white ink composition include EVAFLEX EV210 (an EVA resin available from Du Pont-Mitsui Polychemicals Co., Ltd., 200 nm in particle size) and other EVAFLEX resins as well as SUMIKAFLEX S-201HQ (an EVA resin available from Sumika Chemtex Co., Ltd., 600 nm in particle size), SUMIKAFLEX S-410HQ (an EVA resin available from Sumika Chemtex Co., Ltd., 900 nm in particle size), and other SUMIKAFLEX resins. These are available in market in aqueous emulsion form, where the EVA resin is dispersed in water by an ordinary method, and can be directly added in that form to the white ink composition according to this embodiment.

The average particle size of the EVA resin is preferably in a range of 10 to 800 nm, inclusive, and more preferably 200 to 400 nm, inclusive. Although EVA resins having an average particle size falling within this range all have the effect of reducing cracking on images, this effect is enhanced with the use of an EVA resin having an average particle size in a range of 200 to 400 nm, inclusive.

No particular limitation is imposed on the relation between the average particle sizes R1 and R2 of the EVA resin and the white or whitish pigment described above, respectively. However, these two sizes preferably satisfy a relation $R1 \geq R2-100$ (nm) and more preferably $R1 \geq R2$. R1 and R2 values satisfying this relation allow the ink to be stably ejected. EVA resins help ink adhere to a recording medium and thus improve the rubfastness of images. In particular, the combination use of an EVA resin and the resin component described later (a fluorene resin or a styrene acrylic resin) further effectively improves rubfastness.

The average particle size of the EVA resin can be determined using a laser diffraction/scattering particle size distribution analyzer, such as those using dynamic light scattering as the measurement principle (e.g., Microtrac UPA available from Nikkiso Co., Ltd.).

The EVA resin content (on a solid basis) is preferably in a range of 0.2 to 30 mass %, inclusive, more preferably 0.5 to 5 mass %, inclusive, and particularly preferably 0.7 to 3 mass %, inclusive, relative to the total mass of the white ink composition. When the EVA resin content exceeds this range, the recorded images may be lacking in rubfastness. In any content falling short of this range, however, the EVA resin cannot be counted on for its effect of reducing cracking on images in some cases.

1.2. Polyolefin Wax

Another formula of the white ink composition according to this embodiment contains a polyolefin wax. One of the functions of this polyolefin wax is to reduce cracking on images. The white ink composition according to this embodiment contains a fluorene resin or a styrene acrylic resin as described later, and the images recorded therewith may crack. In such cases, cracking on the images can be effectively reduced by adding a polyolefin wax.

No particular limitation is imposed on the kind of the polyolefin wax; the polyolefin wax may be a wax made of ethylene, propylene, butylene, or any other olefin or of any derivative of them, or it may be a copolymer composed of these olefins and/or derivatives, including polyethylene waxes, polypropylene waxes, and polybutylene waxes. Polyethylene waxes effectively reduce cracking on images and thus are particularly preferred, and they may be used singly or in combination of two or more.

Examples of commercially available polyolefin waxes suitable for use in the white ink composition include CHEMIPEARL W4005 (a polyethylene wax available from Mitsui Chemicals, Inc., having the following characteristics: particle size: 200 to 800 nm; softening point by the ring-and-ball method: 110° C.; hardness by the penetration test: 3; solid content: 40%) and other CHEMIPEARL waxes as well as AQUACER waxes (polyethylene waxes available from BYK Japan KK) including AQUACER 513 (particle size: 100 to 200 nm; melting point: 130° C.; solid content: 30%), AQUACER 507, AQUACER 515, and AQUACER 840, HYTEC resin emulsions (TOHO Chemical Industry Co., Ltd.) including HYTEC E-7025P, HYTEC E-2213, HYTEC E-9460, HYTEC E-9015, HYTEC E-4A, HYTEC E-5403P, and HYTEC E-8237, and NOPCOTE PEM-17 (a polyethylene emulsion available from SAN NOPCO Ltd., 40 nm in particle size). These are available in market in aqueous emulsion form, where the polyolefin wax is dispersed in water by an ordinary method, and can be directly added in that form to the white ink composition according to this embodiment.

The average particle size of the polyolefin wax is preferably in a range of 10 to 800 nm, inclusive, more preferably 150 to 800 nm, inclusive, and particularly preferably 200 to 800 nm, inclusive. Although polyolefin waxes having an average particle size falling within this range all have the effect of reducing cracking on images, this effect is enhanced with the use of a polyolefin wax having an average particle size in a range of 150 to 800 nm, inclusive.

Additionally, the average particle size of the polyolefin wax is preferably greater than that of the white or whitish pigment described above. When this is satisfied, the polyolefin wax easily appears on the surface of images. Thanks to its low coefficient of friction, the polyolefin wax exposed on the surface of images improves their smoothness and rubfastness. In particular, the use of a polyolefin wax having a greater particle size than the white or whitish pigment in combination with the resin component described later (a fluorene resin or a styrene acrylic resin) further effectively improves rubfastness.

The average particle size of the polyolefin wax can be determined using a laser diffraction/scattering particle size distribution analyzer, such as one using dynamic light scattering as the measurement principle (e.g., Microtrac UPA available from Nikkiso Co., Ltd.).

The polyolefin wax content (on a solid basis) is preferably in a range of 0.2 to 30 mass %, inclusive, more preferably 0.3 to 5 mass %, inclusive, and particularly preferably 0.3 to 3 mass %, inclusive, relative to the total mass of the white ink composition. When the polyolefin wax content exceeds this range, the recorded images may be lacking in rubfastness. In any content falling short of this range, however, the polyolefin wax cannot be counted on for its effect of reducing cracking on images in some cases.

1.3. Resin Component

The white ink composition according to this embodiment contains a resin component that cracks when dropped in an amount of 0.5 g onto a glass slide (e.g., MICRO SLIDE GLASS 57213 available from Matsunami Glass Ind., Ltd.) and dried for 10 minutes under a temperature of 50° C. and a relative humidity of 0% RH. More specifically, the resin component is at least either a fluorene resin or a styrene acrylic resin. Contained in the white ink composition according to this embodiment, the resin component helps the ink composition adhere firmly to a recording medium and improves the rubfastness of the images formed on the recording medium.

This resin component may crack when the white ink composition is dried. Whether the resin component has cracked or not can be ascertained by, for example, dropping 0.5 g of it onto a glass slide (MICRO SLIDE GLASS 57213 available from Matsunami Glass Ind., Ltd.), drying for 10 minutes under a temperature of 50° C. and a relative humidity of 0% RH, and then checking for cracks.

The fluorene resin, an example of the resin component, can be any kind of resin having a fluorene backbone, with no particular limitation imposed thereon. It can be obtained by, for example, copolymerizing the following monomer units (a) to (d).

(a) Isophorone diisocyanate (CAS No. 4098-71-9), (b) 4,4'-(9-fluorenylidene)bis[2-(phenoxy)ethanol] (CAS No. 117344-32-8), (c) 3-hydroxy-2-(hydroxymethyl)-2-methyl propionic acid (CAS No. 4767-03-7), (d) triethylamine (CAS No. 121-44-8). In the invention, the fluorene resin can be any kind of resin that contains a monomer having a fluorene backbone, such as 4,4'-(9-fluorenylidene)bis[2-(phenoxy)ethanol] (CAS No. 117344-32-8), with no particular limitation imposed thereon.

On the other hand, the styrene acrylic resin, another example of the resin component, can be a styrene/acrylic acid copolymer, a styrene/methacrylic acid copolymer, a styrene/methacrylic acid/acrylate copolymer, a styrene/α-methyl styrene/acrylic acid copolymer, a styrene/α-methyl styrene/acrylic acid/acrylate copolymer, or the like. Any form of copolymer can be used; the styrene acrylic resin can be a random, block, alternating, or graft copolymer.

Commercially available styrene acrylic resins can also be used. A specific example of ready-made ones is JONCRYL 62J (BASF Japan Ltd.).

Both fluorene resins and styrene acrylic resins can improve the rubfastness of images formed using the white ink composition; however, the former, when mixed in the white ink composition, has a greater effect in improving the rubfastness of images.

The resin component content (on a solid basis) is preferably in a range of 0.2 to 10 mass %, inclusive, more preferably 0.4 to 5 mass %, inclusive, and particularly preferably 0.5 to 3 mass %, inclusive, relative to the total mass of the white ink composition. When the resin component content exceeds this range, cracked images may result, and the ink jet recording head used with the white ink composition may have its ejection stability affected. In any content falling short of this range, however, the resin component may lose its effect of providing images with an excellent rubfastness. Two or more different resin components may be added in combination; the number of resin components is not limited to one.

In the white ink composition according to this embodiment, the ratio (W1/W2) of the EVA resin content (W1) to the resin component content (W2) is in a range of 1/6 to 60/13, inclusive, and preferably 1/6 to 3, inclusive. When containing the EVA resin and the resin component in a ratio falling within this range, the white ink composition according to this embodiment can record images having resistance to cracks and an excellent rubfastness. When containing the EVA resin and the resin component in a ratio deviating from this range, however, the white ink composition according to this embodiment may affect the ejection stability of the ink jet recording head used therewith and/or form cracked images.

1.4. Other Components

The white ink composition according to this embodiment can contain organic solvent or even may contain two or more kinds of organic solvents. Examples of organic solvents used in the white ink composition include 1,2-alkanediols, polyhydric alcohols, and pyrrolidones.

Examples of appropriate 1,2-alkanediols include 1,2-propanediol, 1,2-butanediol, 1,2-pentanediol, 1,2-hexanediol, and 1,2-octanediol. 1,2-Alkanediols effectively help the white ink composition rapidly and uniformly wet a recording medium, thereby making it possible to form excellent images on the recording medium. If any 1,2-alkanediol is contained, its content is preferably in a range of 1 to 20 mass %, inclusive, relative to the total mass of the white ink composition.

Examples of appropriate polyhydric alcohols include ethylene glycol, diethylene glycol, propylene glycol, dipropylene glycol, 1,3-propanediol, 1,4-butanediol, 1,6-hexanediol, and glycerol. Polyhydric alcohols, when the white ink composition is used with an ink jet recording apparatus, prevent the ink from drying to a solid on the nozzle face of the head and reduce clogging, incomplete ejection, and other defects, so they are suitable for use. If a polyhydric alcohol is contained, its content is preferably in a range of 2 to 20 mass %, inclusive, relative to the total mass of the white ink composition.

Examples of appropriate pyrrolidones include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. Pyrrolidones can be good solvent for the resin component. If a pyrrolidone is contained, its content is preferably in a range of 3 to 25 mass %, inclusive, relative to the total mass of the white ink composition.

Furthermore, the white ink composition according to this embodiment can contain surfactant. Silicone surfactants, acetylene glycol surfactants, and other kinds of surfactants can be used as the surfactant.

Examples of appropriate silicone surfactants include polysiloxanes and other similar compounds, for example, polyether-modified organosilixanes. More specific examples include BYK-306, BYK-307, BYK-333, BYK-341, BYK-345, BYK-346, and BYK-348 (trade names; available from BYK Japan KK) and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names; available from Shin-Etsu Chemical Co., Ltd.). Silicone surfactants allow the white ink composition to spread uniformly on a recording medium and prevent from leaving density irregularities or bleeding, so they are suitable for use. If a silicone surfactant is contained, its content is preferably in a range of 0.1 to 1.5 mass %, inclusive, relative to the total mass of the white ink composition.

Examples of appropriate acetylene glycol surfactants include Surfynol 104, 104E, 104H, 104A, 104BC, 104DPM, 104PA, 104PG-50, 104S, 420, 440, 465, 485, SE, SE-F, 504, 61, DF37, DF110D, CT111, CT121, CT131, CT136, TG, and GA (trade names; available from Air Products and Chemicals, Inc.), Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (trade names; available from Nissin Chemical Industry Co., Ltd.), and Acetylenol E00, E00P, E40, and E100 (trade names; available from Kawaken Fine Chemicals Co., Ltd.). Acetylene glycol surfactants can maintain appropriate levels of surface tension and interfacial tension more potently than other kinds of surfactants, and hardly foam. If an acetylene surfactant is contained, its content is preferably in a range of 0.1 to 1.0 mass %, inclusive, relative to the total mass of the white ink composition.

The white ink composition according to this embodiment may be some kind of "aqueous ink," or it may contain water in a content of 50% or more. Compared with non-aqueous ones (solvent inks; an example of non-aqueous inks for making records can be seen in JP-A-2007-16103), aqueous inks are less reactive to piezoelectric elements incorporated in recording heads, organic binders contained in recording media, and other similar materials and thus, under certain conditions, unlikely to dissolve or corrode these materials. Furthermore, images formed using an aqueous ink can be faster to dry than those made using non-aqueous one, which contains a large amount of a high-boiling and low-viscosity solvent. Moreover, aqueous inks smell better than solvent inks and, as a result of containing water in a content of 50% or more, are eco-friendly.

The white ink composition according to this embodiment can further contain a pH-adjusting agent, a preservative/antimold, an antirust, a chelator, and/or other additives. When containing these compounds, the white ink composition according to this embodiment can have further improved characteristics.

Examples of appropriate pH-adjusting agents include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, and sodium bicarbonate.

As for the preservative/antimold, examples of appropriate ones include sodium benzoate, sodium pentachlorophenol, sodium 2-pyridinethiol-1-oxide, sodium sorbate, sodium dehydroacetate, and 1,2-benzisothiazolin-3-one. Appropriate commercially available products include Proxel XL2 and GXL (trade names; available from Avecia, Inc.) and Denicide CSA and NS-500W (trade names; available from Nagase ChemteX Corporation).

As for the antirust, an example of appropriate ones is benzotriazole.

As for the chelator, examples of appropriate ones include ethylenediaminetetraacetic acid and its salts (e.g., disodium dihydrogen ethylenediaminetetraacetate).

The white ink composition according to this embodiment can be prepared in a similar way to known pigment inks, using a known apparatus such as a ball mill, a sand mill, an attritor, a basket mill, a roller mill, or the like. Before preparation, coarse particles are preferably removed by membrane, mesh, and other filters.

1.5. Physical Properties of the White Ink Composition

When the white ink composition is used with an ink jet recording apparatus, its viscosity at 20° C. is preferably in a range of 2 to 10 mPa·s, inclusive, and more preferably 3 to 6 mPa·s, inclusive. With its viscosity at 20° C. falling within this range, the white ink composition can be ejected from nozzles in appropriate amounts and will be further prevented from travelling in random directions or spattering, and thus is suitable for use with an ink jet recording apparatus. The viscosity of the white ink composition can be measured by analysis in VM-100AL oscillating viscometer (Yamaichi Electronics Co., Ltd.) at a constant temperature of 20° C.

1.6. Applications

One, but not the only, application of the white ink composition according to this embodiment is ink jet recording in different modes. Examples of appropriate modes of ink jet recording include thermal ink jet, piezoelectric ink jet, continuous ink jet, roller application, and spray application.

The white ink composition according to this embodiment can be applied to various recording media to form white images. Examples of appropriate recording media include paper, cardboard, fabrics, sheets or film, plastics, glass, ceramics, and metals.

In some cases, white images formed on a recording medium are coated with a clear ink composition, which contains no pigments or any other coloring materials, for purposes such as protecting the images from damage and providing with gloss. During the formation of the layer of the clear ink composition (hereinafter, also referred to as the clear coating), some of the components contained in the white images or in the clear ink composition may aggregate. This may cause the white images and/or the clear coating to crack. However, the white ink composition according to this embodiment effectively reduces cracking on white images even when the images have a clear coating. The clear ink composition mentioned here can be chosen from those having a known formula.

Furthermore, the white ink composition can also be used in cases where color images are recorded on a plastic product, metal product, or any other kind of recording medium that is not necessarily white; it whitens the recording medium so that the color images can be more vivid. Incidentally, the white ink composition may be used in cases where color images are recorded on transparent sheets; it forms a shielding white layer (a base coating) for reducing the transparency of the color images. In general, forming color images on white images (a base coating) using a color ink composition is accompanied in some cases by the aggregation of some of the components contained in the white images or in the color ink composition, and this may cause the white images (base coating) and/or the color images to crack. However, the white ink composition according to this embodiment effectively reduces cracking even when it is used as a base coating for recording of color images. The color ink composition mentioned here can be chosen from those having a known formula featuring a coloring material of cyan, magenta, yellow, black, or any other color (except the white or whitish pigment described above).

2. Examples

The following examples describe the invention in more detail; however, they never limit the scope of the invention.
2.1. Preparation of Ink Compositions
(1) White Ink Compositions The following components were blended in accordance with the formulae specified in Tables 1 to 4: a titanium dioxide pigment, an ethylene-vinyl acetate (EVA) resin/a polyethylene wax, a fluorene resin/a styrene acrylic resin (the resin component), a polysiloxane surfactant, 1,2-hexanediol, 2-pyrrolidone, propylene glycol, and ion-exchanged water. The obtained mixtures were filtered through a 5-μm metal filter and then degassed using a vacuum pump. In this way, the white ink compositions according to Formulae 1 to 30 were obtained. In Tables 1 to 4, the content values under Formulae 1 to 30 are all in the unit of percent by mass (mass %), and those on the titanium dioxide pigment, the EVA resins and polyethylene waxes, and the resin components are all on a solid basis.

Details of the individual components mentioned in Tables 1 to 4 are as follows:

Titanium dioxide pigment: NanoTek® Slurry (a trade name; slurry available from C.I. Kasei Co., Ltd., 15% titanium dioxide particles on a solid basis, 300 nm in average particle size)

EVA resin A: SUMIKAFLEX S-201HQ (a trade name; available from Sumika Chemtex Co., Ltd., 600 nm in particle size)

EVA resin B: SUMIKAFLEX S-410HQ (a trade name; available from Sumika Chemtex Co., Ltd., 900 nm in average particle size)

EVA resin C: EVAFLEX EV210 (a trade name; available from Du Pont-Mitsui Polychemicals Co., Ltd., 200 nm in average particle size)

Polyethylene wax A: CHEMIPEARL W4005 (a trade name; available from Mitsui Chemicals, 600 nm in average particle size)

Polyethylene wax B: NOPCOTE PEM-17 (a trade name; available from SAN NOPCO Ltd., 40 nm in average particle size)

Polyethylene wax C: AQUACEL 513 (a trade name; available from BYK Japan KK, 150 nm in average particle size)

Styrene acrylic resin: JONCRYL 62J (a trade name; available from BASF Japan Ltd.)

Polysiloxane surfactant: BYK-348 (a trade name; available from BYK Japan KK)

The fluorene resin, prepared as described below, and the styrene acrylic resin were tested by dropping 0.5 g of each onto a glass slide (MICRO SLIDE GLASS 57213 available from Matsunami Glass Ind., Ltd.) and drying for 10 minutes under a temperature of 50° C. and a relative humidity of 0% RH: both the resin components cracked.

The fluorene resin in Tables 1 to 4 was synthesized as follows. The following ingredients were thoroughly mixed: 30 parts by mass of isophorone diisocyanate, 50 parts by mass of 4,4'-(9-fluorenylidene)bis[2-(phenoxy)ethanol], 100 parts by mass of 3-hydroxy-2-(hydroxymethyl)-2-methyl propionic acid, and 30 parts by mass of triethylamine. The obtained mixture was stirred for 5 hours at 120° C. in the presence of a catalyst. The finished fluorene resin contained 4,4'-(9-fluorenylidene)bis[2-(phenoxy)ethanol] in roughly 50 mass % on a relative monomer amount basis and had a molecular weight of 3300.

(2) Cyan Ink Composition

A cyan ink composition was prepared by blending the following ingredients: 4 mass % of C.I. Pigment Blue (a cyan pigment), 2 mass % of an acrylic acid/acrylate copolymer (a pigment-dispersing resin having a molecular weight of 25,000, a glass transition temperature of 80° C., and an acid value of 180), 2 mass % of a styrene/acrylic acid copolymer (molecular weight: 50,000; acid value: 130; average particle size: 75 nm), 5 mass % of 1,2-hexanediol, 0.6 mass % of a surfactant (BYK-348, a trade name, available from BYK Japan KK), 0.2 mass % of Surfynol DF-110D (a trade name; available from Nissin Chemical Co., Ltd.), 5 mass % of 2-pyrrolidone, 10 mass % of propylene glycol, and purified water as the balance.

2.2. Rubfastness Test
2.2.1. Preparation of Samples for Rubfastness Test

The recording medium used was Lumirror® S10, 100 μm (PET sheets available from Toray Industries, Inc., having no ink-receiving layer).

The ink jet recording printer used was PX-G930 ink jet printer (a trade name; available from Seiko Epson Corp., 180 dpi in nozzle resolution) modified to have a temperature-adjustable heater on its paper guide.

Each of the white ink compositions in Tables 1 to 4 was loaded into the exclusive ink cartridge of the ink jet printer. The obtained ink cartridge was mounted in the printer. The ink cartridges excluding that for black ink were all commercially available ones. The ink cartridges excluding that for black ink are irrelevant to the advantages of the invention; they were only dummies and not used in the evaluation of this test.

As for printing conditions, the heater temperature setting of the printer was 40° C. The surface temperature of the recording medium measured near the printer head in printing operation was substantially equal to the heater temperature setting. A white solid image was formed on the recording medium described above with the resolution and the duty set at 1440× 720 dpi and 100%, respectively. In this way, samples for rubfastness test were obtained.

2.2.2. Evaluation of Rubfastness

The obtained samples for rubfastness test were dried in an oven at 50° C. for 10 minutes, and the records were rubbed in AB-301 color fastness rubbing tester (Tester Sangyo Co., Ltd.) with its grinders covered with white cotton cloth (Canaquim No. 3), with the load set at 200 g and the number of times of friction 10, and visually inspected for the surface condition of the image. The grades and criteria were as given below; Grade C and higher grades mean the sample had a rubfastness acceptable in practice.

A: No scratches on the surface of the image, and no image detachment

B: Some scratches on the surface of the image, but no image detachment

C: Scratches on the surface of the image, and partial detachment of the image

D: Complete detachment of the image 2.3. Crack Test 2.3.1. Preparation of Samples for Crack Test The recording medium used was Lumirror® S10, 100 μm (PET sheets available from Toray Industries, Inc., having no ink-receiving layer).

The ink jet recording printer used was PX-G930 ink jet printer (a trade name; available from Seiko Epson Corp., 180 dpi in nozzle resolution) modified to have a temperature-adjustable heater on its paper guide.

Each of the white ink compositions in Tables 1 to 4 was loaded into the exclusive ink cartridge of the ink jet printer. Also, the cyan ink composition prepared in (2) Cyan Ink Composition, 2.1. Preparation of Ink Compositions was loaded into an ink cartridge.

The obtained ink cartridges were mounted in the printer. The ink cartridges excluding those for black and cyan inks were all commercially available ones. The ink cartridges excluding those for black and cyan inks are irrelevant to the advantages of the invention; they were only dummies and not used in the evaluation of this test.

As for printing conditions, the heater temperature setting of the printer was 40° C. The surface temperature of the recording medium measured near the printer head in printing operation was substantially equal to the heater temperature setting. A white solid image was formed on the recording medium described above with the resolution and the duty set at 1440×720 dpi and 100%, respectively. The obtained prints, each retaining the white image, were dried in an oven at 50° C. for 10 minutes, and then the cyan ink composition described above was ejected onto the prints with the resolution fixed at 1440×720 dpi and the duty varied from 30% to 100% to form cyan images with different duties. In this way, samples for crack test were obtained.

2.3.2. Evaluation of Resistance to Cracks

The obtained samples for crack test were dried in an oven at 50° C. for 10 minutes and visually inspected for the surface condition of the image. The grades and criteria were as given below; Grade C and higher grades mean the sample had a resistance to cracks acceptable in practice.

A: No cracks on the image at a duty of 100%

B: No cracks on the image at a duty up to 80%

C: No cracks on the image at a duty up to 50%

D: Cracks on the image even at a duty of 30%

2.4. Discharge Stability Test

With each of the compositions, a solid image was printed on an A4 recording medium to make 100 prints, with the temperature setting as specified above and the resolution and the duty set at 1440×720 dpi and 100%, respectively. The hundredth print was observed for dead or displaced dots. The grades and criteria were as given below, and the test results are summarized in Tables 1 and 2.

A: No dead or displaced dots found

B: Dead or displaced dots found 2.5. Test Results

The results of all the tests described above are summarized in Tables 1 to 4.

TABLE 1

| White ink composition | | Formula 1 | Formula 2 | Formula 3 | Formula 4 | Formula 5 | Formula 6 | Formula 7 | Formula 8 | Formula 9 | Formula 10 | Formula 11 |
|---|---|---|---|---|---|---|---|---|---|---|---|---|
| Titanium dioxide pigment | | 10.00 | 10.00 | 10.00 | 10.00 | 10.00 | 10.00 | 10.00 | 10.00 | 10.00 | 10.00 | 10.00 |
| EVA resin A | | 3.00 | 3.00 | 3.00 | 3.00 | 3.00 | | | 3.00 | 1.00 | 0.50 | 0.25 |
| EVA resin B | | | | | | | 3.00 | | | | | |
| EVA resin C | | | | | | | | 3.00 | | | | |
| Fluorene resin | | 0.50 | 0.75 | 1.00 | | 3.00 | 3.00 | 3.00 | | 3.00 | 3.00 | 3.00 |
| Styrene acrylic resin | | | | | 1.00 | | | | 3.00 | | | |
| Polysiloxane surfactant | | 1.00 | 1.00 | 1.00 | 1.00 | 1.00 | 1.00 | 1.00 | 1.00 | 1.00 | 1.00 | 1.00 |
| 1,2-Hexanediol | | 5.00 | 5.00 | 5.00 | 5.00 | 5.00 | 5.00 | 5.00 | 5.00 | 5.00 | 5.00 | 5.00 |
| 2-Pyrrolidone | | 2.00 | 2.00 | 2.00 | 2.00 | 2.00 | 2.00 | 2.00 | 2.00 | 2.00 | 2.00 | 2.00 |
| Propylene glycol | | 8.00 | 8.00 | 8.00 | 8.00 | 8.00 | 8.00 | 8.00 | 8.00 | 8.00 | 8.00 | 8.00 |
| Ion-exchanged water | | Balance | Balance | Balance | Balance | Balance | Balance | Balance | Balance | Balance | Balance | Balance |
| Total (mass %) | | 100 | 100 | 100 | 100 | 100 | 100 | 100 | 100 | 100 | 100 | 100 |
| EVA resin (W1)/Fluorene resin (W2) | | 6/1 | 4/1 | 3/1 | — | 1/1 | 1/1 | 1/1 | — | 1/3 | 1/6 | 1/12 |
| EVA resin (W1)/Styrene acrylic resin (W2) | | — | — | — | 3/1 | — | — | — | 1/1 | — | — | — |
| Test results | Crack test | A | A | A | A | A | A | A | A | B | C | D |
| | Rubfastness test | D | C | B | C | A | A | B | B | A | A | A |
| | Discharge stability test | A | A | A | A | A | B | A | A | A | A | A |

TABLE 2

| White ink composition | Formula 12 | Formula 13 | Formula 14 | Formula 15 |
|---|---|---|---|---|
| Titanium dioxide pigment | 10.00 | 10.00 | 10.00 | 10.00 |
| EVA resin A | 3.00 | 0.00 | 0.00 | 0.00 |
| EVA resin B | | | | |
| EVA resin C | | | | |
| Fluorene resin | 0.00 | 3.00 | | 0.00 |
| Styrene acrylic resin | | | 3.00 | |
| Polysiloxane surfactant | 1.00 | 1.00 | 1.00 | 1.00 |
| 1,2-Hexanediol | 5.00 | 5.00 | 5.00 | 5.00 |
| 2-Pyrrolidone | 2.00 | 2.00 | 2.00 | 2.00 |
| Propylene glycol | 8.00 | 8.00 | 8.00 | 8.00 |
| Ion-exchanged water | Balance | Balance | Balance | Balance |
| Total (mass %) | 100 | 100 | 100 | 100 |
| EVA resin (W1)/Fluorene resin (W2) | — | 0 | — | — |
| EVA resin (W1)/Styrene acrylic resin (W2) | — | — | 0 | — |
| Test Crack test | A | D | D | A |

TABLE 2-continued

| White ink composition | | Formula 12 | Formula 13 | Formula 14 | Formula 15 |
|---|---|---|---|---|---|
| results | Rubfastness test | D | A | B | D |
| | Discharge stability test | A | A | A | A |

TABLE 3

| White ink composition | Formula 16 | Formula 17 | Formula 18 | Formula 19 | Formula 20 | Formula 21 | Formula 22 | Formula 23 | Formula 24 | Formula 25 | Formula 26 |
|---|---|---|---|---|---|---|---|---|---|---|---|
| Titanium dioxide pigment | 10.00 | 10.00 | 10.00 | 10.00 | 10.00 | 10.00 | 10.00 | 10.00 | 10.00 | 10.00 | 10.00 |
| Polyethylene wax A | 3.00 | 3.00 | 3.00 | 3.00 | 1.00 | | | 1.00 | 1.00 | 0.50 | 0.30 | 0.27 |
| Polyethylene wax B | | | | | | 1.00 | | | | | |
| Polyethylene wax C | | | | | | | 1.00 | | | | |
| Fluorene resin | 0.43 | 0.50 | 1.00 | | 3.00 | 3.00 | 3.00 | | 3.00 | 3.00 | 3.00 |
| Styrene acrylic resin | | | | 1.00 | | | | 3.00 | | | |
| Polysiloxane surfactant | 1.00 | 1.00 | 1.00 | 1.00 | 1.00 | 1.00 | 1.00 | 1.00 | 1.00 | 1.00 | 1.00 |
| 1,2-Hexanediol | 5.00 | 5.00 | 5.00 | 5.00 | 5.00 | 5.00 | 5.00 | 5.00 | 5.00 | 5.00 | 5.00 |
| 2-Pyrrolidone | 2.00 | 2.00 | 2.00 | 2.00 | 2.00 | 2.00 | 2.00 | 2.00 | 2.00 | 2.00 | 2.00 |
| Propylene glycol | 8.00 | 8.00 | 8.00 | 8.00 | 8.00 | 8.00 | 8.00 | 8.00 | 8.00 | 8.00 | 8.00 |
| Ion-exchanged water | Balance | Balance | Balance | Balance | Balance | Balance | Balance | Balance | Balance | Balance | Balance |
| Total (mass %) | 100 | 100 | 100 | 100 | 100 | 100 | 100 | 100 | 100 | 100 | 100 |
| Polyethylene wax (W1)/Fluorene resin (W2) | 300/43 | 6/1 | 3/1 | — | 1/3 | 1/3 | 1/3 | — | 1/6 | 1/10 | 9/100 |
| Polyethylene wax (W1)/Styrene acrylic resin (W2) | — | — | — | 3/1 | — | — | — | 1/3 | — | — | — |
| Test results Crack test | A | A | A | A | A | A | A | A | B | C | D |
| Test results Rubfastness test | D | C | B | C | A | C | B | B | A | A | A |

TABLE 4

| White ink composition | Formula 27 | Formula 28 | Formula 29 | Formula 30 |
|---|---|---|---|---|
| Titanium dioxide pigment | 10.00 | 10.00 | 10.00 | 10.00 |
| Polyethylene wax A | 3.00 | | | |
| Fluorene resin | | 3.00 | | |
| Styrene acrylic resin | | | 3.00 | |
| Polysiloxane surfactant | 1.00 | 1.00 | 1.00 | 1.00 |
| 1,2-Hexanediol | 5.00 | 5.00 | 5.00 | 5.00 |
| 2-Pyrrolidone | 2.00 | 2.00 | 2.00 | 2.00 |
| Propylene glycol | 8.00 | 8.00 | 8.00 | 8.00 |
| Ion-exchanged water | Balance | Balance | Balance | Balance |
| Total (mass %) | 100 | 100 | 100 | 100 |
| Polyethylene wax (W1)/Fluorene resin (W2) | — | 0 | — | — |
| Polyethylene wax (W1)/Styrene acrylic resin (W2) | — | — | 0 | — |
| Test results Crack test | A | D | D | A |
| Test results Rubfastness test | D | A | B | D |

As can be seen from the test results in Table 1, the white ink compositions according to Formulae 1 to 11 showed the ability to record images having crack resistance and rubfastness both acceptable in practice. In particular, in the white ink compositions according to Formulae 2 to 10, the ratio (W1/W2) of the EVA resin content (W1) to the resin component content (W2) fell with in a range of 1/6 to 60/13, inclusive. As a result, according to the test results in Table 1, the white ink compositions according to Formulae 2 to 10 proved better than the others in terms of the crack resistance or rubfastness of the images recorded therewith.

On the other hand, in Table 2, the white ink composition according to Formula 12 contained no fluorene resin or styrene acrylic resin. As a result, according to the test results in Table 2, the white ink composition according to Formula 12 failed the rubfastness test as the image was insufficiently resistant to frictions.

Furthermore, the white ink compositions according to Formulae 13 and 14, in Table 2, contained no EVA resin. As a result, according to the test results in Table 2, the white ink compositions according to Formulae 13 and 14 failed the crack test as even the images recorded at low duties cracked.

Also, the white ink composition according to Formula 15, in Table 2, contained no EVA resin or resin component. As a result, according to the test results in Table 2, the white ink composition according to Formula 15 failed the rubfastness test as the image was insufficiently resistant to frictions.

As can be seen from the test results in Table 3, the white ink compositions according to Formulae 16 to 26 showed the ability to record images having crack resistance and rubfastness both acceptable in practice. In particular, in the white ink compositions according to Formulae 17 to 25, the ratio (W1/W2) of the polyolefin wax content (W1) to the resin component content (W2) fell with in a range of 1/10 to 6, inclusive. As a result, according to the test results in Table 3, the white ink compositions according to Formulae 17 to 25 proved better than the others in terms of the crack resistance or rubfastness of the images recorded therewith.

On the other hand, in Table 4, the white ink composition according to Formula 27 contained no resin component. As a result, according to the test results in Table 4, the white ink composition according to Formula 27 failed the rubfastness test as the image was insufficiently resistant to frictions.

Furthermore, the white ink compositions according to Formulae 28 and 29, in Table 4, contained no polyolefin wax. As a result, according to the test results in Table 4, the white ink compositions according to Formulae 28 and 29 failed the crack test as even the images recorded at low duties cracked.

Also, the white ink composition according to Formula 30, in Table 4, contained no polyolefin wax or resin component. As a result, according to the test results in Table 4, the white ink composition according to Formula 30 failed the rubfastness test as the image was insufficiently resistant to frictions.

What is claimed is:
1. A white ink composition comprising:
a white or whitish pigment;
an ethylene-vinyl acetate (EVA) resin or a polyolefin wax; and a resin component that cracks when dropped in an amount of 0.5 g onto a glass slide and dried for 10 minutes under a temperature of 50° C. and a relative humidity of 0% RH.

2. A white ink composition comprising:
a white or whitish pigment;
an EVA resin or a polyolefin wax; and
a fluorene resin or a styrene acrylic resin.

3. The white ink composition according to claim 1, wherein:
the resin component is a fluorene resin or a styrene acrylic resin.

4. The white ink according to claim 1, wherein:
a ratio (W1/W2) of an EVA resin content (W1) to a resin component content (W2) is in a range of 1/6 to 60/13, inclusive.

5. The white ink composition according to claim 1, wherein:
a ratio (W1/W2) of a polyolefin wax content (W1) to a resin component content (W2) is in a range of 1/10 to 6, inclusive.

6. The white ink composition according to claim 1, wherein:
the white or whitish pigment is titanium dioxide.

7. The white ink composition according to claim 1, wherein:
an average particle size of the polyolefin wax is in a range of 10 to 800 nm, inclusive.

8. The white ink composition according to claim 1, wherein:
an average particle size of the EVA resin is in a range of 10 to 800 nm, inclusive.

9. The white ink composition according to claim 1, wherein:
the average particle size of the white or whitish pigment is in a range of 200 to 400 nm, inclusive.

10. The white ink composition according to claim 1, wherein:
an average particle size R1 of the EVA resin and an average particle size R2 of the white or whitish pigment satisfy a relation $R1 \geq R2$.

11. The white ink composition according to claim 1, wherein:
a resin component content is in a range of 0.4 to 5 percent by mass, inclusive.

12. A recording apparatus making a record using the white ink composition according to claim 1.

13. A record made using the white ink composition according to claim 1.

14. A white ink composition comprising:
a white or whitish pigment;
an ethylene-vinyl acetate (EVA) resin or a polyolefin wax;
a resin component that cracks when dropped in an amount of 0.5 g onto a glass slide and dried for 10 minutes under a temperature of 50° C. and a relative humidity of 0% RH; and
a ratio (W1/W2) of the EVA resin content (W1) to the resin component content (W2) is in a range of 1/6 to 60/13, inclusive.

15. A white ink composition comprising:
a white or whitish pigment;
an EVA resin or a polyolefin wax; and
a fluorene resin or a styrene acrylic resin, wherein a ratio (W1/W2) of the polyolefin wax content (W1) to the fluorene or styrene acrylic resin component content (W2) is in a range of 1/10 to 6, inclusive, or a ratio (W1/W2) of the EVA resin content (W1) to the fluorene or styrene acrylic resin component content (W2) is in a range of 1/6 to 60/13, inclusive.

* * * * *